(12) United States Patent
Rao (10) Patent No.: US 8,203,249 B1
(45) Date of Patent: Jun. 19, 2012

(54) REDUCING THE CORE-END HEATING IN LARGE POWER GENERATORS

(76) Inventor: Dantam K. Rao, Schenectady, NY (US)

( * ) Notice: Subject to any disclaimer, the term of this patent is extended or adjusted under 35 U.S.C. 154(b) by 0 days.

(21) Appl. No.: 13/236,397

(22) Filed: Sep. 19, 2011

(51) Int. Cl.
    *H02K 3/46* (2006.01)
(52) U.S. Cl. .................................. 310/256; 310/260
(58) Field of Classification Search .................. 310/256, 310/86, 260, 270
    See application file for complete search history.

(56) References Cited

U.S. PATENT DOCUMENTS

| | | | |
|---|---|---|---|
| 1,689,187 A | | 10/1928 | Pohl |
| 1,689,188 A | * | 10/1928 | Pohl et al. ............... 310/256 |
| 1,769,816 A | | 3/1929 | Yakota |
| 2,795,714 A | | 6/1957 | Baudry |
| 3,435,262 A | | 3/1969 | Bennett et al. |
| 3,649,860 A | * | 3/1972 | Richardson ............... 310/260 |
| 3,714,477 A | | 1/1973 | Gott |
| 3,731,127 A | | 5/1973 | Harrington |
| 3,824,683 A | * | 7/1974 | Rhudy ................... 29/596 |
| 3,886,387 A | | 5/1975 | Graham et al. |
| 4,031,422 A | | 6/1977 | Armor et al. |
| 4,054,809 A | | 10/1977 | Jeffries |
| 4,152,615 A | | 5/1979 | Calfo et al. |
| 4,258,281 A | | 3/1981 | Calfo et al. |
| 4,281,266 A | | 7/1981 | Calfo et al. |
| 4,488,077 A | * | 12/1984 | Kova/cs .................. 310/212 |
| 4,638,199 A | | 1/1987 | Brem et al. |
| 4,683,388 A | * | 7/1987 | De Cesare ................ 310/46 |
| 5,430,340 A | * | 7/1995 | Shih et al. ............... 310/214 |
| 5,723,920 A | * | 3/1998 | Markovitz et al. ........... 310/45 |
| 5,821,652 A | * | 10/1998 | Hyypio ................... 310/83 |
| 6,157,109 A | | 12/2000 | Schfert et al. |
| 6,202,285 B1 | * | 3/2001 | Bell ..................... 29/596 |
| 6,455,977 B2 | | 9/2002 | Leyvraz et al. |
| 6,525,444 B2 | | 2/2003 | Salem et al. |
| 6,608,419 B2 | | 8/2003 | Shah et al. |
| 6,858,967 B2 | | 2/2005 | Montgomery et al. |
| 7,057,324 B2 | | 6/2006 | Breznak et al. |
| 7,095,153 B1 | | 8/2006 | Shoykhet |
| 7,265,473 B2 | | 9/2007 | Salem et al. |
| 7,843,104 B2 | | 11/2010 | Thangirala |
| 2003/0201689 A1 | | 10/2003 | Shah et al. |
| 2005/0121992 A1 | | 6/2005 | Leonov |
| 2009/0184594 A1 | | 7/2009 | Chay et al. |

* cited by examiner

*Primary Examiner* — Dang Le (57) ABSTRACT

The invention provides for flux-shields wrapped around the flux-sources at the core-end of large power generators. They prevent overheating of all core-end parts under all abnormal conditions of operation. A first flux-shield is an electrically conductive cylindrical shell concentric with rotating endwindings, held outside the retaining ring. The rotating flux source induces eddy currents in the first flux-shield whose flux repels the source flux. Only a small part of the rotating source flux is hence received by all the core-end parts, thereby greatly reducing their temperatures. A second flux-shield comprises an electrically conductive tape wrapped over the ground-insulation of stator bars protruding from the core. Alternating flux generated by the stator bars induces eddy currents in the second flux-shield whose flux repels the source flux. Only a small fraction of the source flux is hence received by all core-end parts, thereby greatly reducing their temperatures. The present invention replaces multiple devices such as step-iron, flux-shields, flux shunts, short-rotors etc, used in the prior-art with only two devices. As a result, the design of the core-end is simplified and the cost of the generator is reduced.

7 Claims, 6 Drawing Sheets

FIG. 5
prior-art

FIG. 6

FIG. 12
prior-art

REDUCING THE CORE-END HEATING IN LARGE POWER GENERATORS

FIELD OF THE INVENTION

This invention relates to large electric power generators, particularly to devices that prevent overheating of multiple components in the core-end.

BACKGROUND OF THE INVENTION

It is well known that the core-ends of large generators have two flux-sources (i.e., current carrying conductors)—an end-winding carrying direct currents in the rotor and an end-winding carrying alternating currents in the stator. It also has a large number of flux-receivers (i.e., conductive components that can carry induced currents)—stepped end-laminations, flanges, clamp bars, keybars, vent duct spacers, vent support sheets, retaining rings, centering disks, rotating shaft etc. The two flux sources radiate a fringe-flux field that rotates at synchronous speed. This fringe flux impinges large conductive surfaces of all flux-receivers, inducing large eddy currents in them. Further, in different abnormal conditions of operation, the fringe flux concentrates at different locations in the flux receivers wherein temperatures can be hotter than average. Ensuring that temperatures of all hot spots in all flux receivers in all abnormal conditions are within design limits (to prevent derating of the generator) is a major challenge to the core-end designer. The end laminations also carry the useless fringe-flux in addition to the usable main flux; hence, the flux density in them is so close to the saturation limit that excess flux may spill into air; this induces more eddy current that can overheat, forcing the generator to operate at lower power rating. Further, if the insulative coating on the end-lamination surfaces is defective and prone to shorts, the exciting voltage of the fringe-flux drives eddy currents through the shorts and can melt the iron; such microscopic shorts burn the insulation around the hot spot, propagating the melt zone, leading to core failure. Thus reduced power and core failure risks are the additional drivers to reduce overheating at all flux-receiver hot spots.

Figure 1:
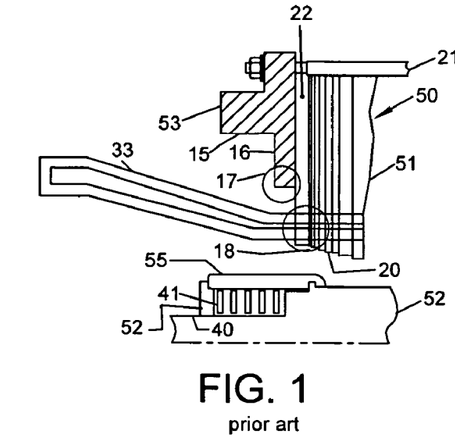
FIG. 1 is a cross-section of core-end showing the flux-sources, flux-receivers and potential hot spots in the prior-art.

FIG. 1 is a longitudinal section view of the core-end 50 of a large generator showing the two flux-sources 41, 33 and multiple flux receivers 53, 18, 20, 22, 55, 40, 52. The flux-source 41 is a rotor end-winding encased between steel shaft 40, retaining ring 55 and a centering ring 52. It carries direct current, which radiates rotating flux in free space. The large tooth surfaces of end-iron 20 receive this rotating fringe flux at ~90°; it induces large eddy currents that create a hot spot 18. A second flux-source 33 is a stator end-winding carrying alternating currents that radiates alternating flux. Near the flange bore 17 this flux is received radially at 90° inducing large eddy currents, creating another hot spot 17. Thus, typical hot spots highlighted in FIG. 1 can be the end-iron 18 (due to axial component of rotor flux source 41) and the flange bore 17 (due to radial component of stator flux source 33). The generator can be conceived as two rotating bar magnets, one in the rotor and other in the stator that chase each other. Their angular displacement defines the phase angle. Normally this angle is lagging, both magnets repel, so the stator bar magnet prevents flux from the rotating bar magnet from entering so the stator is somewhat less saturated. However, in one abnormal condition—termed leading phase angle—both magnets attract, so the stator magnet invites more flux from rotating magnet; so rotating magnet's axial component saturates the end-iron and overheats the end-laminations. In another abnormal condition—termed sudden short circuit—large currents flow through stator windings, so the stator magnet becomes so powerful at the protrusion of stator bars so its large radial component overheats the inner periphery of flange 17 and its shield. Its spatial component also hits and overheats the rotating retaining ring 55. Thus, devices to limit core-end heating should reduce not only the axial component but also the radial component of fringe flux in diverse locations under diverse abnormal conditions.

Over the past century, several devices have been developed to reduce core-end heating. Most of them attempt to reduce the flux received by the flux-receivers (instead of reducing the flux radiated by the flux-sources). Such flux receiver-focused devices can be grouped into modifiers (viz., step-iron, flux-shunts and short-rotors) and shields. The modifiers tend to alter the geometry or materials of the flux-receivers so that less flux impinges them. Step-iron and short rotors for example change the geometry of end-iron and rotor that increases the path reluctance hence reduces the flux received. Flux shunts add magnetic materials to divert part of the source flux away from flux receivers. The flux-receiver shield is a device of high electrical conductivity conforming to the shape of a flux receiver it protects and separated from it by a gap. Flux from the source hits the shield creating eddy currents whose fields repel the source flux; so less flux is received by the flux-receiver. For example, flux shield on a flange is an annular ring of copper, shaped like a flange and separated by a gap. Flux shield on end-iron is a conductive plate positioned over the end-laminations. Prior-art has developed such diverse devices in an attempt to reduce hot spot temperatures in individual core-end parts. Almost all of them accomplish this by reducing the flux received by the flux receiver without disturbing the flux sources as discussed below.

End-stepping 20 (to reduce the flux received by end-iron 18 only) is well-known in the prior-art. The end-steps 20 involve filling the last few inches of the core with stepped end-packages; teeth are possibly slit. The longer path in the stepped region increases path reluctance, reducing the flux received by the end-laminations and hence reducing the eddy heat. The funnel shape also eases the entrance losses. However, there are some unresolved issues. a) The effect is one of redistribution of axial flux, rather than its reduction, so the lower peak flux in the conical gap is accompanied by a rise elsewhere per Mecrow (1989). b) End-stepping requires higher excitation current, increasing losses in the rotor per U.S. Pat. Nos. 6,525,444 and 7,057,324. c) End-stepping reduces the clamping pressure in the bar and tooth tip, which could make them, rattle and break. d) Gradients in the axial flux induce additional eddy heat. e) Abrupt steps in the flow could result in coolant-starved areas creating new hot spots. f) More eddy current is induced inside the bar strands creating new hot spots; to counter this U.S. Pat. No. 6,455,977 disclosed an alternative profile that contains an unstepped zone facing the retaining ring. Alternatives ways to reduce overheating of the end-iron include: low-loss amorphous metal (U.S. Pat. No. 6,525,444), low-loss M4 grade steel (U.S. Pat. No. 7,265,473) or laminations with easy-axis of magnetization along teeth (U.S. Pat. No. 7,057,324). However, amorphous metals suffer from lower saturation limit and enormous cost, M4 steel does not alter the basic eddy loss mechanism and easy teeth require an expensive dies to cut laminations with easy axis along tooth.

Flux shunts on end-iron (to reduce the flux received by end-iron 18 only) are magnetic materials that divert some or all fringe-flux. However, a flux shunt attracts more flux, so they must be designed carefully. Flux shunts differ in location, geometry and magnetic materials. For example, U.S. Pat. No. 3,714,477 disclosed a flux shunt positioned about tooth, made of laminations with surfaces at 90° to fringe-flux. Such surfaces normal to the fringe flux induce large eddy currents, overheating it. U.S. Pat. No. 4,258,281 discloses an alternative flux shunt with lamination surface at 0° to fringe-flux; but such construction is structurally weak. U.S. Pat. No. 4,281,266 disclosed an alternative flux shunt made of laminations bent and bolted to a tapered finger-ring. However, since lamination surface is at 90° to the fringe-flux, large induced eddy currents overheat it. Recent U.S. Pat. No. 6,608,419 and application 20030201689 overcome these problems with an alternative flux shunt of powder-iron blocks in the conical air gap. However, powder-iron blocks saturate fast, causing them to overheat. U.S. Pat. No. 4,054,809 disclosed an alternative flux shunt between the flange and end windings, comprised of wound iron wire in an epoxy cast. However, epoxy expands faster leading to delamination. U.S. Pat. No. 1,769,816 discloses an alternative flux shunt of annular ring of magnetic material over retaining ring. However, the magnetic ting attracts more flux increasing losses. A short rotor (to reduce the flux received by end-iron 18 only) is another well-known strategy. However, shortening a rotor reduces the active length of the radial gap, reducing the power. Restoring to rated power requires an increase in the excitation current, which increases rotor losses.

Improved flanges (to reduce the flux received by flange 53 only) rely on materials with increased resistivity, such as better cast iron (U.S. Pat. No. 7,843,104), aluminum, non-magnetic stainless steel (U.S. Pat. No. 6,455,977), or radially segmented plates that breakup eddy currents (U.S. Pat. No. 6,858,967). Fully laminated flanges in U.S. Pat. No. 4,638,199 and EP No. 0171571 are made by bonding laminations stacks that are stepped from inner to outer periphery of the core. However, since lamination surface is at 90° to the fringe-flux, they produce severe eddy heat. Flanges comprising non-magnetic stainless steel plates sandwiching a flux shunt of laminations at 90° to fringe flux are also disclosed in U.S. Pat. No. 6,858,967. However, such laminations produce large eddy heat.

Flux shield on flanges (to reduce the flux received by flange 53 only) shown in U.S. Pat. No. 3,714,477 is an annulus made of copper adjacent to the flange and spaced with a venting passageway. Analysis by Mecrow (1989) indicates that minimal losses occur at about 1.5 times skin depth. Such shields force the source flux to flow around the radial corners, thereby increasing path length and reducing the flux. However the flux and eddy heat get concentrated around the shield's inner periphery, especially in wrap-around shields. Thus, even with loss optimization the shield invariably requires better cooling means, especially in high-powered generators. Improved shield cooling means include ducts (U.S. Pat. No. 3,435,262), brazed fins (U.S. Pat. No. 4,031,422, DE 2638908), channels, grooves (U.S. Pat. Pub. No. 2009/0184594), shield/flange isolation (U.S. Pat. No. 3,886,387).

Flux shields on end-iron (to reduce the flux received by end-iron 18 only) disclosed in U.S. Pat. No. 4,152,615 is in the form of conductive plates over tooth. Alternative flux shield disclosed in U.S. Pat. No. 3,731,127 is a thin conductive shell wrapped around the protrusion of stator bars. An active shield disclosed in U.S. Pat. Pub. No. 20050121992 consists of a flux sensor, a controller to compute currents required to produce a canceling flux and a power source that applies such currents to a flux-canceling coil. However, the sensors and exciting coils are located in the straight segment of the end-windings, so the flux radiated by the bent portion could still overheat the core-end.

From this short review, it is clear that the prior-art focused on flux receivers and constructed diverse devices to reduce their overheating. However, these diverse devices require great attention to details in the design of each device, their support structure and cooling. The losses in all these devices also add up, reducing the efficiency. In contrast, the present invention focuses on the two flux sources and presents flux-shields on the flux sources. Designing two flux shields is much simpler and economical than design of a variety of shunts, shields, end-steppers and integrating their support structure into the core-end. Further, reducing the flux at the source—as presented in this invention—prevents overheating of all flux receivers under all abnormal conditions.

SUMMARY OF THE INVENTION

A major object of the present invention is to reduce overheating of all core-end parts simultaneously under diverse abnormal conditions. Another object is to replace a variety of devices such as core-end stepping, flange shield, flux shunts and others that have been used in the prior art with simpler flux shields. Another object is to clamp the tooth up to its tip thereby avoiding tooth or bar breakup. Another object is to reduce the cost of the generator. Another object is to increase the efficiency of the generator. These and other objects can be understood by a person skilled in the art on perusal of the detailed description of the invention.

One embodiment of the invention is passive shields made of electrically conductive materials conforming to the general shape of flux-sources and wrapped around them. A first flux shield (to reduce flux from the rotor flux source) is a stationary cylindrical shell made of electrically conductive material positioned outside the retaining ring. It is coaxial to and extends co-extensively axially over the rotor end-windings. A second source-flux shield (to reduce flux from the stator flux source) is an electrically conductive tape wound over the ground insulation of the stator bars protruding from the core-end. The flux radiated by the flux sources induce eddy currents in these shields whose flux repels the source-flux. As a result only a small fraction (about $\frac{1}{4}^{th}$) of flux leaks from the outside surfaces of these flux-source shields. Since losses and temperature rise are proportional to the square of the flux received, they will be small (about $\frac{1}{16}$th).

Alternative embodiment of the invention employs a flux-cancellation technique. It uses active flux shields, i.e., coils wound around the flux sources through which current is pumped by external means; the flux generated by these external currents repel or cancel the source flux. The flux cancellation technique employs diverse sensors to sense temperatures and fields at potential hot spots, an algorithm to estimate the current required by the active flux shields to cancel respective source fields, a power source to generate and apply the required flux-canceling currents to the active flux shields and a closed loop controller to coordinate all parts to achieve the target temperatures and/or fluxes at respective hot spots.

DESCRIPTION OF THE EXEMPLARY EMBODIMENTS

Figure 2:
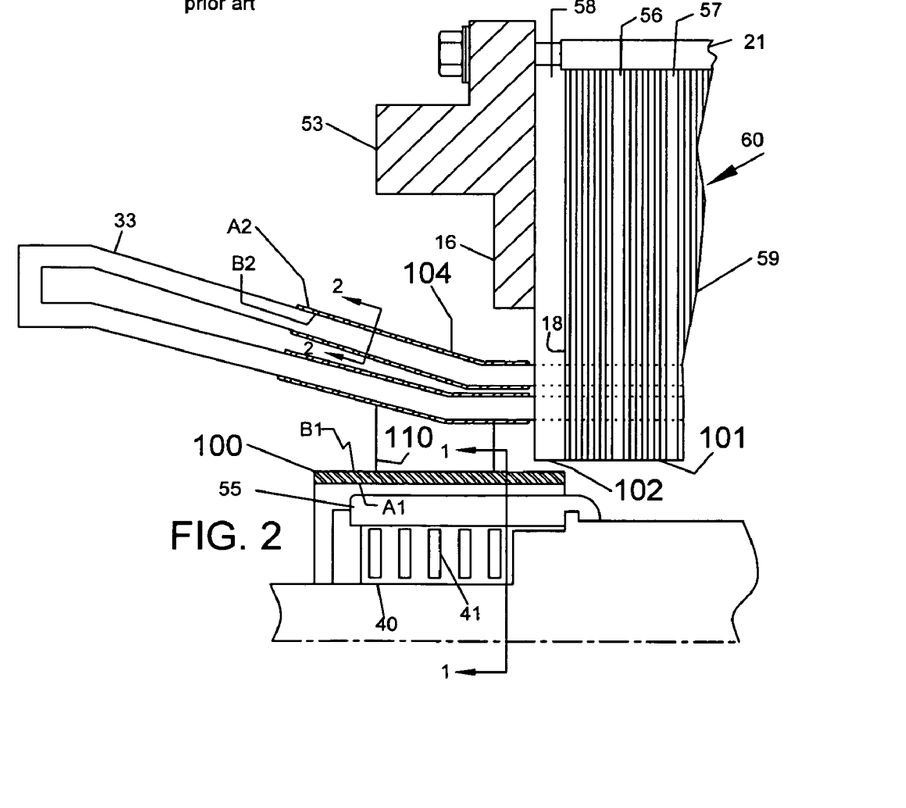
FIG. 2 is a cross-section of the core-end, showing the passive flux-shields on flux-sources in accordance with the present invention.

FIG. 2 shows the core-end 60 with a first flux-shield 100 on rotating flux source 41 and a second flux shield 104 on stationary flux source 33 in accordance with the present invention. The goal of the flux shields 100, 104 is to ensure that only a fraction of the flux produced by respective flux sources is received by any of the multiple flux receivers. The end-lamination packages 101, 59 in the core end 60 are identical to those used in the main body of the generator. That is, generators in accordance with the present invention do not have and end-stepped laminations, thereby saving on cost. The end-lamination packages 101, 59 are cooled by outer vent duct 58 and inner vent ducts 56, 57 as in conventional generators. But the outer vent spacer 58 extends all the way up to the bore 102 of the core, thereby strengthening the support to the tooth tips and stator bars, preventing their rattling and breakdown.

Figures 3, 4:
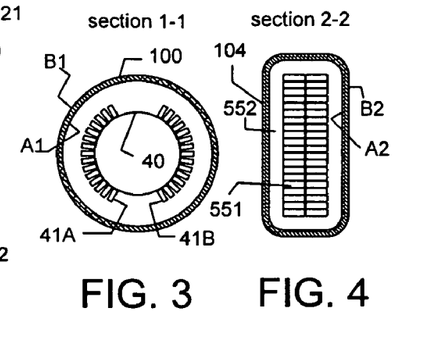
FIG. 3 is a cross-section at section 1-1 showing the shield on rotating flux-source in accordance with the present invention.
FIG. 4 is a cross-section at section 2-2 showing the shield on the stationary flux-source in accordance with the present invention.

FIG. 3 is a sectional view at 1-1 showing the cross-section of the first flux shield 100 around the first flux-source 41A, 41B of rotating end-windings. This flux shield 100 is a cylindrical shell made of electrically conductive material such as copper. The flux shield 100 is positioned outside the retaining ring 55, is coaxial to, and extends co-extensively axially surrounding the flux source 41A, 41B. One end of the first flux shield 100 is preferably in proximity and aligned with inner tip 102 of outer duct spacer 58 as shown in FIG. 2. The other end of flux shield 100 extends beyond the rotor end-winding symmetrically. The inner periphery A1 of the shield 100 faces the flux source 41A, 41B and repels the source flux generated by 41A, 41B while its outer periphery B1 faces all the flux receivers and radiates the leaked flux into them. The shield 100 can be supported by various support means such as support plates 110 attached to the end-winding. The flux shield's mean diameter preferably equals the mean air gap diameter. A flux shield with smaller mean diameter is closer to the source and produces more eddy currents; hence, it has higher shield effectiveness but it also produces higher loss. The effectiveness and loss of flux shield 100 are optimized by its size, resistivity, permeability and thickness. The material of flux shield 100 preferably has lower relative permeability $\mu_r \leq 1$ (such as diamagnetic materials) as lower $\mu_r$ increases skin depth so reduces the heat load density. The thickness of the shield 100 preferably is about 1.5 times skin depth, as it appears to minimize loss. All shields produce large eddy currents so generate heat. Cooling means via extended surfaces (fins, pins, foldings), or enhanced surfaces (chemically or mechanically roughened surfaces, microstructured surfaces etc.) may be added to inside or outside periphery of the shield 100 to maintain its temperatures within specified limits. Flow smoothening devices such as entrance funnels, diverters, and baffles can also be added to reduce entrance losses. A person skilled in the art can employ shields with alternative support means, cooling means and entrance loss control means without altering the basic invention.

FIG. 4 is a sectional view at 2-2 showing the cross-section of the second flux shield 104 around the second flux source 551 of stator bar of end-windings covered by ground insulation 552. The flux shield 104 is a thin tape of high electrical conductivity material such as copper that is not insulated. The bare copper tape is half-lap wound tightly over the ground insulation of the end windings. The tape winding should have little or no air gap between successive turns. Such winding can be made by the same tape-winding machine that is used to wind the ground insulation. The winding of the bare copper tape starts at the point where the stator bar protrudes out of the core. The flux shield 104 is wound up to mid-way of stator end-windings, as the balance does not greatly affect the core-end. The inner periphery A2 of the flux shield 104 sees the alternating flux from flux source 551. The alternating flux from source 551 induces eddy currents in the tape-shield 104 whose flux repels the source flux. Only a small a fraction hence leaks from the outer surfaces B2 of the flux shield 104 and is received by all flux receivers thereby reducing their temperatures.

Figure 5:
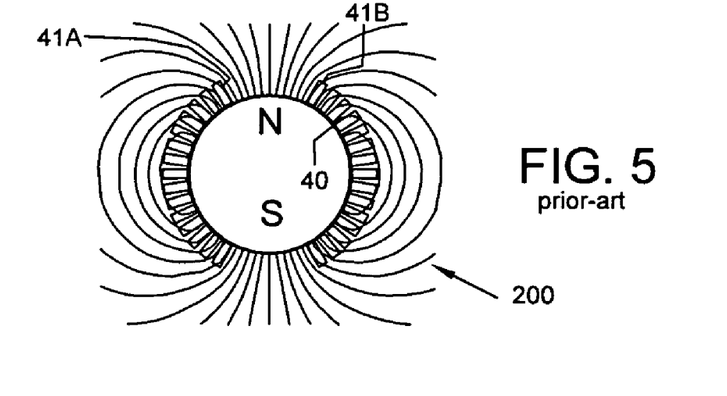
FIG. 5 is a cross-section showing the flux radiated by the rotor flux-source into free space.

FIG. 5 is a cross-section of the rotating flux source 41A, 41B at section 1-1 along with flux lines radiated by it into free space. The rotor flux source 41 comprises group of free-standing end-conductors 41A spread around one-half of shaft periphery. The return conductors 41B are spread around the other half of the shaft periphery. Both carry currents in opposite directions. The direct current carried by 41A, 41B produces a rotating bar magnet in the shaft 40. The flux 200 radiated by the flux source 41A, 41B into free space form elliptical loops of increasingly larger diameter. They close the loop around the conductors 41A, 41B, and define North Pole N and South Pole S on the shaft 40. The elliptical paths 200 shoot out from the North Pole N of the magnetic shaft 40 and close the loop back to the South Pole S.

Figure 6:
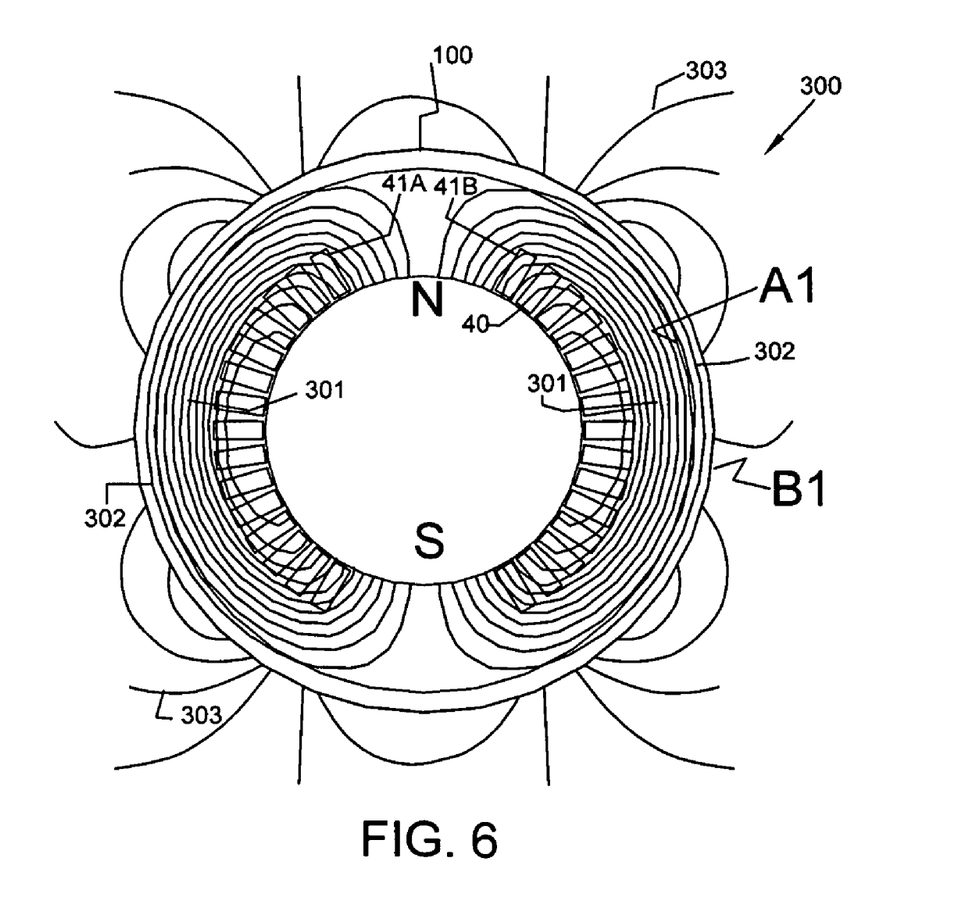
FIG. 6 is a cross-section showing the flux radiated by the flux shield covering the rotor flux-source.

FIG. 6 is a cross-section showing flux lines 300 of the rotor flux-source 41A, 41B after the flux shield 100 installed. The rotating flux from the source 41A, 41B induces eddy currents in the rotor flux shield 100 whose flux prevents penetration of the source flux. In effect, the rotor flux shield 100 compresses flux lines 301 into an annular region formed by the inner surface A1 of the shield 100 and the outer surface of the flux source 41A, 41B. A few flux lines 302 penetrate the flux shield. A far fewer flux lines 303 leak out of the outer surface B1 of the flux shield 100. Since this outer surface B1 faces all flux receivers, only a small fraction of the source flux 200 is thus received by all flux receivers. This fraction is so small that it does not overheat the core-end.

Figure 7:
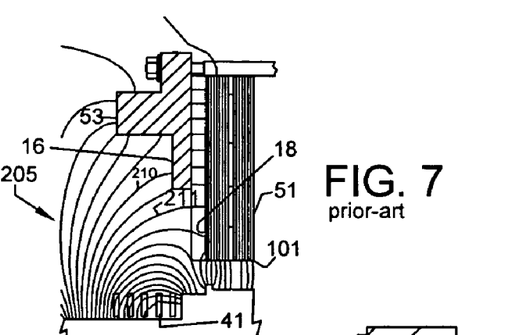
FIG. 7 is a longitudinal section of core-end showing the flux radiated by the rotor flux-source and received by the flux-receivers.

FIG. 7 is a longitudinal view showing the flux lines 205 radiated by the rotating flux source 41 without the flux shield 100 and received by the flux receivers such as flange 53 and end-iron 18. These iron bodies attract and bend source flux lines 200 in free space like a petal to form axial fringe flux lines 205. This fringe flux then flows circumferentially halfway in respective flux-receivers to the south-pole S in the shaft to close the loop. A portion 210 of this flux 205 is received at nearly 90° by the large conductive surfaces 16 of the flange 53; portion 211 is also received at nearly 90° by the large conductive surface of end-iron 18. If there is no flux shield 100, both create large eddy currents and eddy heat.

Figure 8:
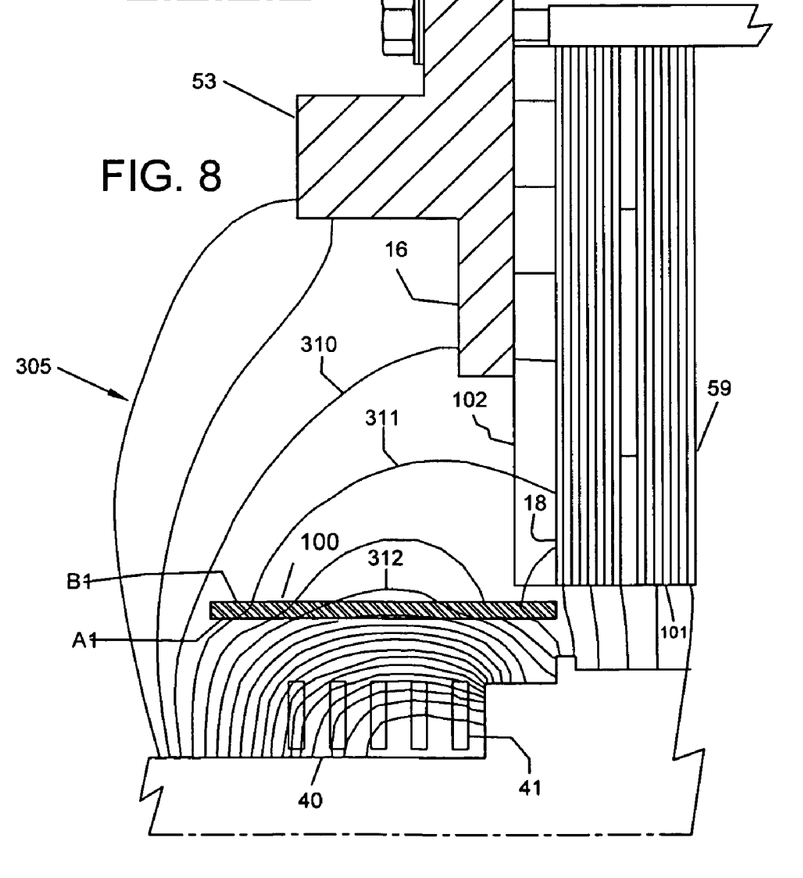
FIG. 8 is a longitudinal section of the core-end showing the flux radiated by the flux shield covering the rotor flux source.

FIG. 8 is a longitudinal view showing the flux lines 305 received by the flange 53 and end iron 18 after the cylindrical shell flux shield 100 surrounding the flux-source 41 is installed. The shield 100 generates eddy currents whose field repels the flux radiated by the flux source 41 impinging its inner periphery A1. It can be seen that the flux shield 100 compresses the source flux to stay within an annular region formed by the inner periphery A1 and outer periphery of flux source 41. As a result, it radiates only a small fraction of flux from its outer periphery B1. Thus, the flux receivers such as flange 16 and end-iron 18 receive significantly smaller flux 310, 311. The fraction by which flux is reduced by the shield is detailed in FIGS. 9-11.

Figures 9, 10:
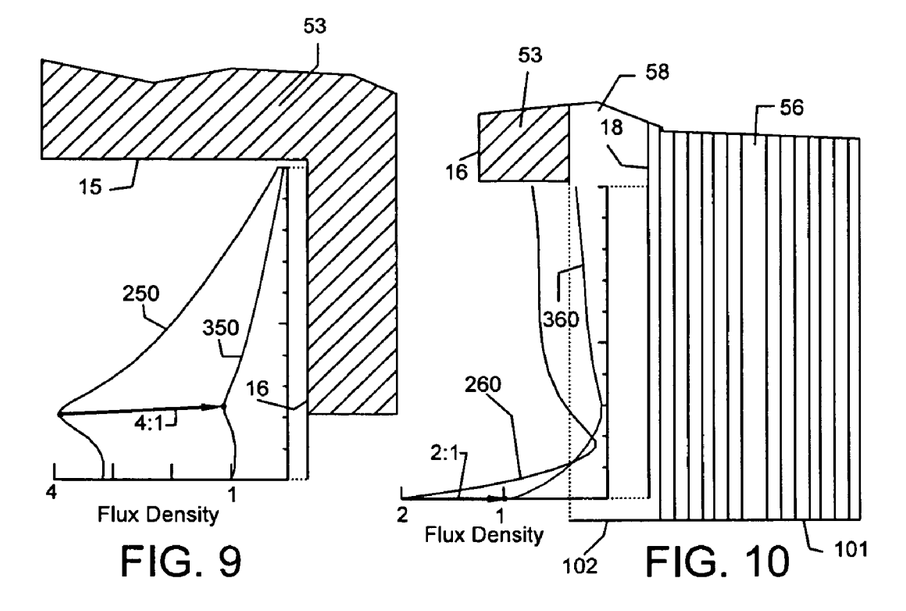
FIG. 9 is a flange detail showing the effectiveness of the flux shield in the flange.
FIG. 10 is an end-iron detail showing effectiveness of the shield in the end iron laminations.

FIG. 9 is a flange detail showing reduction in the peak flux density in the flange after the flux-shield 100 is installed. This figure is a zoomed view of flange periphery 15 and sidewall 16. An embedded plot shows how the axial flux density varies radially along the sidewall 16. Plot 350 shows this variation with the flux shield installed while plot 250 shows the same without the flux shield. From these plots, it is clear that flux density peaks at the inner periphery of the flange and tapers off as radius increases. These plots also show that the flux-shield 100 decreases the peak flux density in the flange by a factor of 4. Since the eddy power loss and temperature rise are proportional to the square of the flux, it is clear that the flux shield 100 decreases temperature rise in the hot spot of the flange by a factor of 16.

FIG. 10 is an end-iron detail showing reduction in peak flux density in the end-laminations 18 after the flux-shield 100 is installed. This figure is a zoomed view of end-iron, showing unstepped end-iron 18, unstepped end-iron packages 101, outer duct spacer 55, and duct spacer 58. An embedded plot shows how the axial flux density varies radially along the end-iron 18. The plot 360 shows this variation with the flux shield installed while the plot 260 shows the same without the flux shield. From these plots 260, 360 it is clear that flux density peaks at the inner periphery of end-iron. These plots also show that the flux shield 100 reduces the peak flux density received by the end-laminations by a factor of 2. Since eddy loss and temperature rise are proportional to the square of the flux, it is clear that the flux shield 100 reduces temperature rise in the end-iron 18 by a factor of 4.

Figure 11:
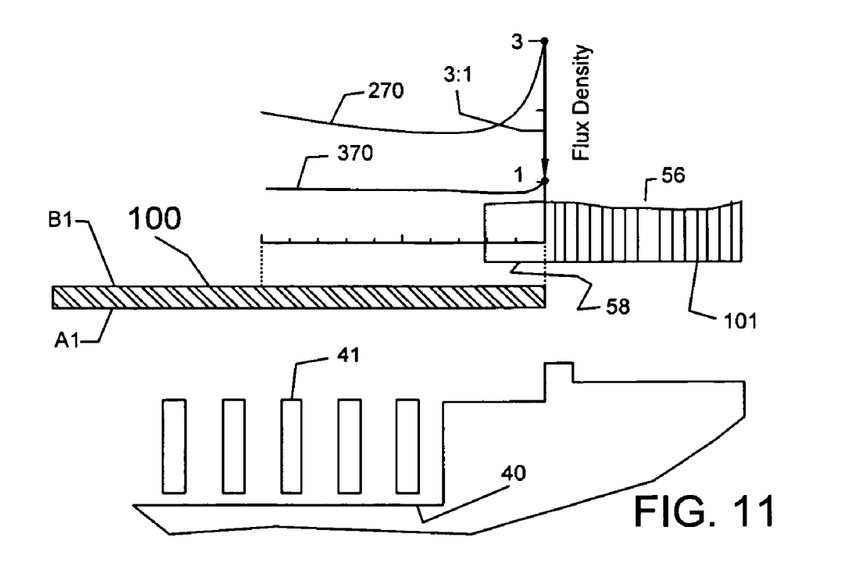
FIG. 11 is a flux-shield detail showing how the flux shield reduces the peak flux density around the flux shield.

FIG. 11 is a flux-shield detail showing reduction in peak flux density after the flux-shield 100 is installed. It shows the flux shield 100 with one end aligned with the unstepped end-iron packages 101. An embedded plot shows how the radial flux density varies axially along the outer periphery of the flux shield 100. The plot 370 shows this variation with the flux shield installed and the plot 270 shows the same without the flux shield. From these plots, it is clear that flux density peaks at the inner end of the flux shield. These plots also show that installation of the flux shield 100 reduces the peak flux density by a factor of 3.

Figure 12:
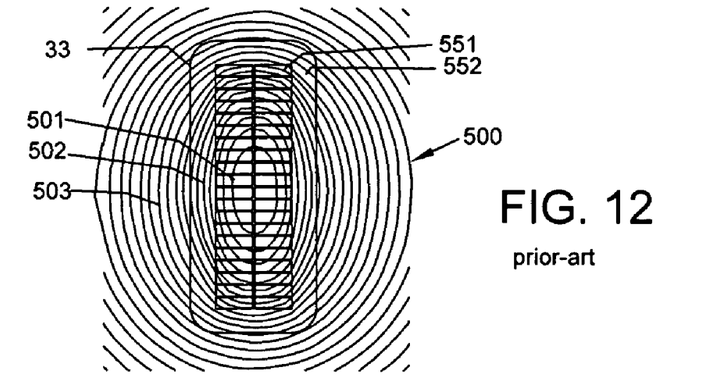
FIG. 12 is a cross-section showing flux radiated into free space by the stator flux-source.

FIG. 12 shows the cross-sectional view of the flux field 500 radiated by second flux source of stator end winding 33 in free space. This stationary flux source is a free-standing stator bar 33 that is not surrounded by iron laminations and consists of ground insulation 552 surrounding two columns of copper strands 551. Alternating current flowing through the columns of strands 551 radiates this flux field 500 into free space. This flux field comprises elliptical flux lines of increasing size that close around the bar center. Some flux lines 501 pass within the strands 551; flux lines 502 pass through the ground insulation 552; all remaining flux lines 503 pass through free-space surrounding the flux source 551.

Figure 13:
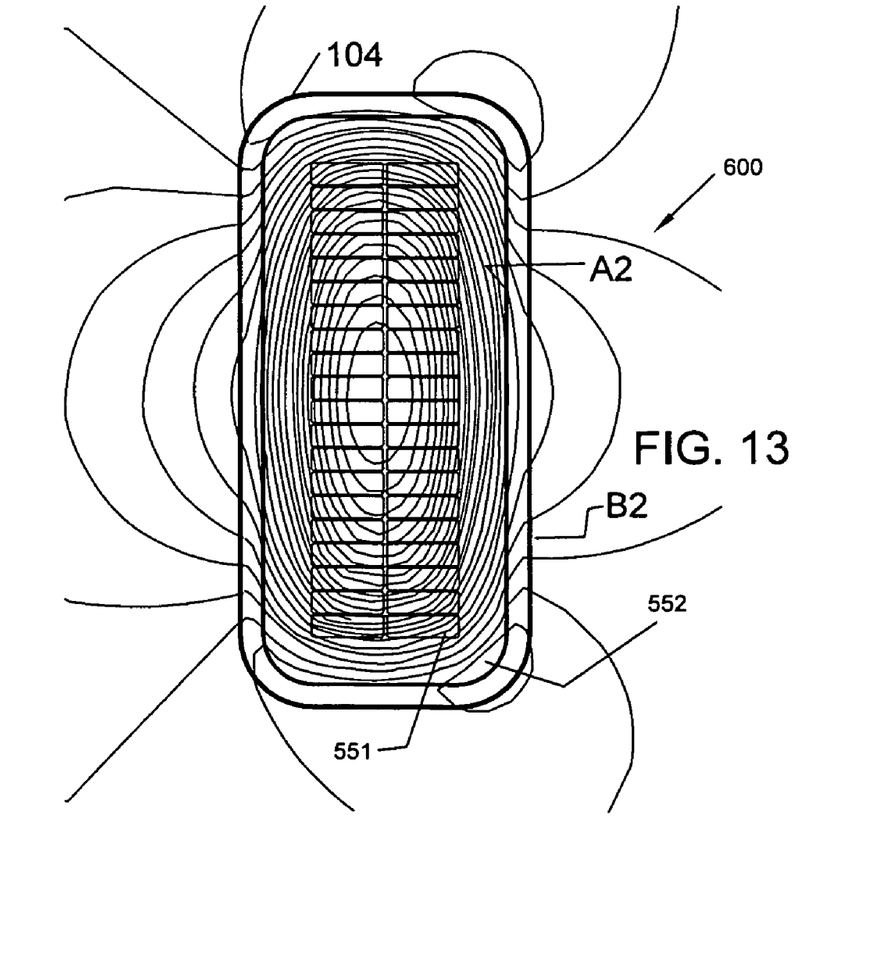
FIG. 13 is a cross-section showing flux radiated by the flux shield covering the stator flux source.

FIG. 13 is a cross-sectional view of the flux field 600 radiated by the stator flux-source 551 with a flux shield 104 installed. The alternating flux radiated by the source 551 induces eddy current in the flux shield 104 whose flux repels the source flux. In effect, the stator flux shield 104 compresses the flux lines into an annular space formed by the inner surface A2 of the shield 104 and the outer surfaces of the source flux 551. As a result, only a small fraction radiating out of the surface B2 and is received by all flux receivers. Since loss and temperature rise are proportional to the square of the flux received, this small fraction results in negligible temperature rise in all core-end components.

Figure 14:
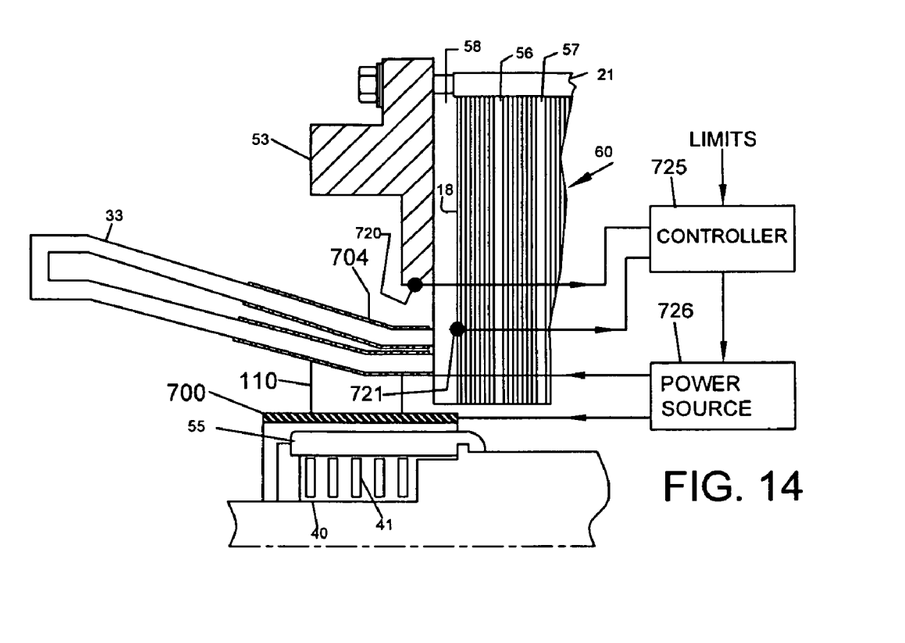
FIG. 14 is a flux cancellation scheme employing a closed loop controller to reduce the temperatures of the core end.

FIG. 14 shows an alternative flux cancellation technique employing a closed loop controller to reduce the temperatures of the core end. It employs active flux shields 700, 704 as opposed to passive flux shields 100, 104. The flux cancellation technique uses temperature or flux sensors 720, 721 in potential hot spots in flange 53 and core end 18 and feeds them into a controller 725. The controller 725 uses built in software to estimate the current required by the active flux shields 700, 704 to cancel the source fluxes. It sends control signals to a power source 726, which generates and applies alternating current to active flux shields 700, 704 to cancel the source flux. Because the source fluxes are cancelled in this manner, the temperature and/or flux density at hot spots fall.

Figure 15:
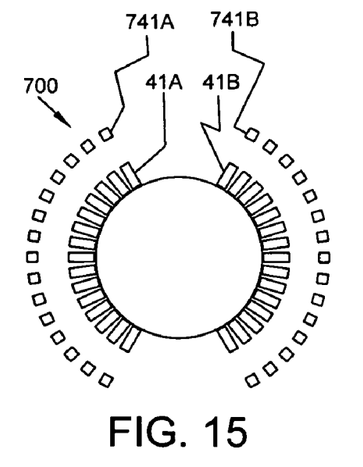
FIG. 15 is a cross-section of an active flux shield surrounding the rotor flux source.

FIG. 15 is a sectional view of the active flux shield 700. This active shield 700 is built around the first flux-source 41A, 41B of rotating end-windings. This active flux shield 700 comprises copper coils 741A, 741B that are images of source coils 41A, 41B. They are positioned outside the retaining ring 55 and are coaxial to and extends co-extensively over the rotor end-windings 41A, 41B. One end of the active flux shield 700 is preferably in proximity and aligned with tip 102 of outer duct spacer 58. The other end extends beyond the rotor end-winding symmetrically.

Figure 16:
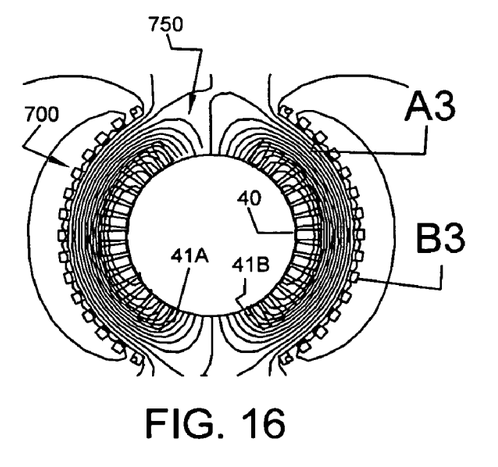
FIG. 16 is a cross-section of the flux radiated by the active flux shield surrounding the rotor flux source.

FIG. 16 is a cross-section showing the flux 750 radiated by the rotor flux-source 41A, 41B after active flux shield 700 is installed. The flux-canceling currents are pumped into the active flux shield 700 by the controller 725 and power source 726. As shown, the active flux shield 700 compresses the flux lines to stay within an annular space formed by the inner surface A3 of the active flux shield 700 and the outer surface of the source 41A, 41B. As a result, only a small fraction radiating out of the surface B3 is received by all flux receivers. Therefore, their temperature rise will be small.

The invention claimed is:

1. A flux-shield to reduce heating of multiple flux-receiving components in the core-end of a dynamo-electric machine having a retaining ring and a rotating flux-source of rotating end-windings carrying direct currents located inside the retaining ring, comprising a stationary cylindrical shell made of electrically conductive material positioned co-axially and co-extensively about the rotating end-windings and positioned outside the retaining ring.

2. A flux shield to reduce heating of multiple flux receiving components in the core-end of a dynamo-electric machine having a non-rotating flux-source of an array of insulated stator bar conductors protruding from the core-end carrying alternating current, comprising a tape of electrically conductive material wrapped around each insulated stator bar conductor, starting from the protruding end of each stator bar conductor and ending about the mid-length of each protruding stator bar conductor.

3. The flux shield of claim 1 in which the thickness of said cylindrical shell is at least one skin depth at the operating frequency and temperatures of the machine.

4. The flux shield of claim 1 in which said cylindrical shell is made of copper.

5. A stator for a dynamoelectric machine comprising:
   (a) a stator with stator end-windings carrying currents;
   (b) a rotor with rotor end-windings carrying currents;
   (c) a first flux-shield of claim 1; or
   (d) a second flux-shield of claim 2.

6. The flux shield of claim 2 in which said tape is made of copper.

7. A flux shield to reduce heating of multiple flux-receiving components in a dynamo-electric machine having a non-rotating flux-source of an array of insulated stator bar conductors protruding from the core-end carrying alternating current and a rotating flux-source of rotating end-windings carrying direct current located inside a retaining ring, comprising:
   a) a sensor means to sense temperatures or flux densities of potential hot spots in the core end;
   b) a first flux-canceling coil positioned co-axially and co-extensively about the rotating end-windings and held outside the retaining ring and a second flux-canceling coil wrapped around each insulated stator bar conductor;
   c) a flux-canceling algorithm to estimate currents required by the flux-canceling coils to cancel the flux radiated by the rotating flux-source and the non-rotating flux-source;
   d) a power source to generate and apply said flux canceling currents to said flux canceling coils;
   e) a closed-loop controller that utilizes the sensor means, the flux-canceling algorithm and the power source to supply flux-canceling currents to the flux-canceling coils and adjust the strength of the flux-canceling currents continuously to limit temperatures of hot spots in all the core end components to within specified temperature limits.

\* \* \* \* \*